INVENTOR.
EARL J. M$^C$ CARTNEY
BY
ATTORNEY

United States Patent Office 3,436,556
Patented Apr. 1, 1969

3,436,556
OPTICAL INSPECTION SYSTEM
Earl J. McCartney, Rockville Centre, N.Y., assignor to Sperry Rand Corporation, a corporation of Delaware
Filed Mar. 24, 1966, Ser. No. 537,228
Int. Cl. H01j 39/12
U.S. Cl. 250—223                                13 Claims

ABSTRACT OF THE DISCLOSURE

A noncontacting electro-optical inspection system for checking the location and measuring the diameter, symmetry and burr content of holes in material parts. A transport mechanism carries the part across the path of a light beam directed at a rotating electro-optic probe having an appropriately dimensioned and wavelength sensitive mask affixed thereto. Amplitude and frequency information imparted to the light as a hole traverses the beam is sensed by a photodetector in the probe and converted to an equivalent electrical signal which is then applied to a data processor wherein the signal is analyzed to obtain discrete information relating to the various hole parameters.

---

This invention relates to measurement devices and more particularly to a noncontacting electro-optical system which rapidly and automatically inspects holes in material parts.

The inspection of holes in material parts has heretofore been accomplished with mechanical plug gauges and optical devices of the microscope type. The plug gauge, which is manually inserted into the hole under inspection, provides a composite measurement of diameter, roundness and burr content. Inability to obtain a suitable fit between the gauge and hole signifies that one or more of the hole characteristics does not satisfy the required tolerances, but the particular characteristic responsible for the inadequate adjustment is not indicated. Microscope type instruments have been used for both inspecting burrs and measuring hole diameter, the latter being performed by aligning the microscope's optical axis with one edge of a hole and counting the number of revolutions of a precision dial that are required to position the diametral edge of the hole under the optical axis.

Roundness of holes has also been determined with instruments which direct streams of fluid through the hole to pitot probes located on the opposite side of the hole close to its perimeter. Since the fluid responsive probes are disposed on orthogonal axes passing through the hole center, a lack of roundness is indicated by differential pressure in the probes. Instruments of this type are suitable only for hole diameters on the order of ¼ inch or larger.

A primary disadvantage associated with the aforementioned hole inspection devices is that they cannot readily be adapted to automatic systems. This disadvantage is particularly significant when the part that is to be inspected is, for example, a printed circuit panel containing several hundred or more small holes on the order of ⅛ inch diameter or less. In such instances the cost of inspecting the panels quite frequently exceeds their manufacturing cost.

One of the principal objects of the present invention, therefore, is to provide a noncontacting inspection system which rapidly and automatically inspects punched or bored holes in machined, fabricated or die cast parts.

Another object of the present invention is to provide a noncontacting inspection system which measures hole diameter, symmetry, location and burr content.

A further object of the present invention is to provide an automated inspection system that furnishes a separate electrical signal indicative of each of the hole parameters which it measures.

According to the present invention, these and other objects are achieved with a noncontacting rotary optical probe used in conjunction with a numerical machine tool control comprising a transport bed, a positioning system and a data processing system. The piece that is to be inspected is placed on the transport bed which is driven by the positioning system. As the transport bed translates along a single axis, a row of holes in the part undergoing inspection passes between the lower end of the rotating probe and a collimated beam of light projected from beneath the transport bed. An aperture in the end of the probe samples the collimated light passing through a hole and conveys it to a photomultiplier tube which converts the sampled light intensity to an electrical signal. This signal is processed in the data processing system along with information from the positioning system to obtain the aforementioned measurements of the hole characteristics. Upon completing the traversal of a row of holes the transport bed is stepped sideways to the next row and when the last row has been inspected the process is repeated along an orthogonal axis.

The invention will be described with reference to the accompanying drawings, wherein FIG. 1 is a pictorial drawing of a preferred embodiment of the invention.

FIG. 9b is a plan view of the optical probe shown in FIG. 9a.

Figure 1:
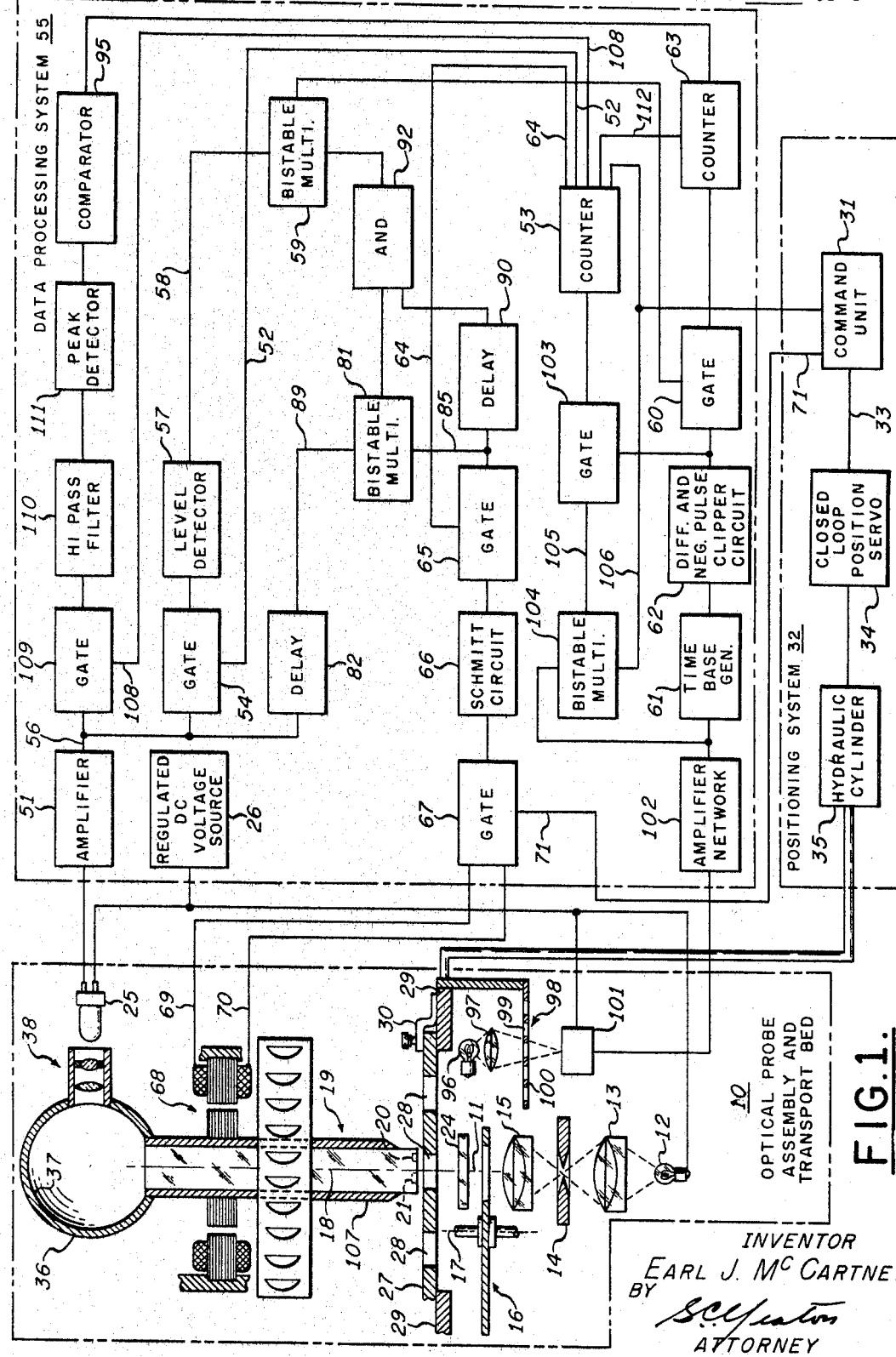
Figure 2:
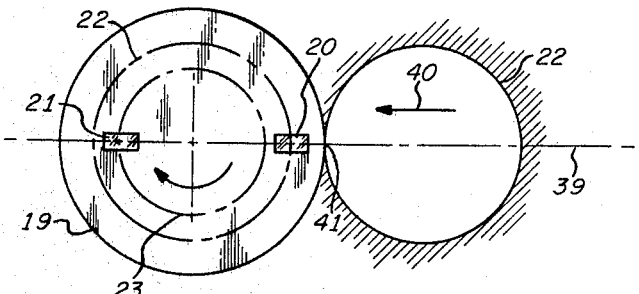
FIGS. 2–5 are diagrams useful in explaining the operation of the embodiment of the invention shown in FIG. 1.

Referring to FIG. 1, the optical probe assembly 10 used in an embodiment of the present invention includes a collimated light beam 11 derived from a standard arc source 12 by means of light collecting lens 13 which focuses the arc source at circular aperture 14 located at the focal point of achromatic lens 15. The color filter wheel 16 in which various color filters are mounted in an annular band is rotatable about its axis 17. A desired color filter is rotated into the path of collimated light beam 11 to obtain a single color from the white light emitted by arc source 12. The collimated light beam is aligned with its rays parallel to the axis 18 of probe 19 which is preferably a hollow metal cylinder but may also be a solid part such as quartz or glass. The lower end of probe 19 is opaque with the exception of the scanning apertures 20 and 21 which are optical interference type color filters coated on clear radial segments. Each color filter of the wheel 16 passes a light beam whose wavelength matches the spectral passband of one of the scanning apertures. A particular scanning aperture is selected for the inspection process simply by indexing the color filter wheel to the proper position. The distance from the center of probe 19 to the center of the selected aperture must equal the radius of the hole that the aperture is to inspect as shown in FIG. 2, wherein apertures 20 and 21 relate respectively to holes 22 and 23. Consequently, the diameters of both the probe 19 and light beam 11 are made slightly greater than the diameter of the largest hole that will be encountered. Although two scanning apertures are indicated by way of example, the actual number required will depend on the particular application of the invention. The radial dimension of the individual scanning apertures should not exceed approximately one-eighth of the diameter of the holes which they inspect but must be slightly greater than the width of the annulus formed by the combined errors in the hole parameters.

For holes having a minimum diameter of 1/32 inch (.03125″), scanning apertures 20 and 21 typically have dimensions in the radial direction and orthogonal thereto on the order of .004 inch and .001 inch respectively. The variably neutral density filter 24 adjusts the intensity of collimated light beam 11 so that photomultiplier tube 25 operates in the linear region. Linear operation is essential because the accuracy of the measurement is related to the amplitude of the photomultiplier tube output signal as will hereinafter become apparent from the detailed description pertaining to the measurement of the hole parameters. For this reason, the arc source 12 and the photomultiplier tube are excited by a variable regulated D.C. power source 26. The material part 27 in which the holes 28 are located is attached to the transport bed 29 of an inspection machine (not shown) by clamps 30 (only one shown). The command unit 31 of the positioning system 32 provides a manual or tape input signal 33 to a closed loop position servo 34 which actuates hydraulic cylinder 35 to drive the transport bed 29. The optical probe assembly 10 is mounted on the stationary frame of the inspection machine immediately above the travel path of the material part 27. The material part prevents the light beam 11 from reaching the scanning apertures 20 and 21 except when a hole or portion thereof is carried into the path of the beam. Light entering the appropriate scanning aperture propagates through the probe 19 into the light integrating sphere 36 enclosing the upper end of the probe and produces an electrical signal at the output of the photomultiplier tube 25.

The white and uniformly diffusive inner surface 37 of the integrating sphere 36 causes light rays entering the sphere to undergo multiple internal reflections. As a result, the inner surface becomes uniformly illuminated so the brightness level at any instant is indicative of the instantaneous quantity of collimated light entering the selected scanning aperture in the lower end of probe 19. The field of view of the Maxwellian view optics 38, which encompasses a substantial portion of the integrating sphere's inner surface, is imaged onto the photocathode of photomultiplier tube 25. The combination of the integrating sphere and the Maxwellian view optics precludes the light beam propagating through probe 19 from being focused at continuously varying points on the photocathode surface as the scanning aperture rotates over the inspection region that is the area circumscribed by the selected scanning aperture. Hence, irrespective of the point in the rotary scan at which the light beam 11 enters the scanning aperture the image at the photocathode surface remains stationary thereby compensating for the variations in sensitivity that inherently exist across the surface of a photocathode. Since the accuracy of the measurements is dependent upon a sufficient quantity of light reaching the photocathode to produce a signal at the output of the photomultiplier tube in excess of the random noise, it is important particularly when high accuracy is required to minimize fluctuations in the responsivity of the system. The integrating sphere and Maxwellian view optics comprise the presently preferred configuration but they may be replaced by a simple light collecting lens when less stringent measurement accuracies are satisfactory.

Figure 3:
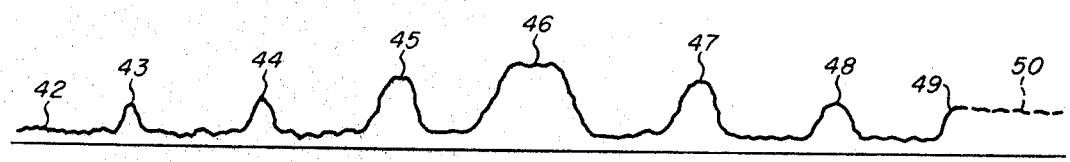

Referring to FIGS. 2 and 3 in conjunction with FIG. 1, the photomultiplier tube 25 output waveforms resulting from various relative positions of the hole and inspection region will now be described. FIG. 2 shows an end view of the probe 19 in relation to a perfectly round hole 22 about to enter the inspection region along axis 39 in the direction indicated by arrow 40 wherein the collimated light beam 11 of FIG. 1 is oriented normal to the plane of the drawing. Before the leading edge 41 of the hole advances into the inspection region, the collimated light beam is blocked from the selected scanning aperture 20 and the photomultiplier tube output is at the random noise level 42 depicted in FIG. 3. When the hole starts to traverse the inspection region, only a small portion of the scanning aperture is exposed to the collimated light beam on the first scan made by the rotating probe 19. The intensity and collimation of the light beam, dimensions of the scanning aperture, and relative speeds of the rod and transport bed are adjusted so that a sufficient quantity of light reaches the light integrating sphere 36 on either the first or second scan to produce a photomultiplier tube output 43 which exceeds the random noise level. As the leading edge 41 progresses through the first half of the inspection region, the scanning aperture 20 sweeps across increasingly larger arcuate sections of the hole and the photomultiplier tube output increases correspondingly as shown at 44, 45 and 46. The pulse amplitude is proportional to the area of the scanning aperture that is exposed to the light beam on each revolution of the probe and its duration is determined by the time interval for which it is exposed. Amplitude clipped pulses of the form 46 occur when the hole has advanced far enough into the inspection region to expose the entire aperture on each scan. During the period in which the leading edge 41 passes through the second half of the inspection region, the scanning aperture is exposed to the light beam over successively smaller arcuate sections during each circular scan and the photomultiplier tube output decreases as shown at 47 and 48. Inasmuch as the rotational speed of the probe is considerably higher than the translational speed of the hole, approximately 100 or more pulses of the form 43 through 48 will actually occur. When the center of the hole is located directly under the longitudinal axis of the probe 19, one-half of the scanning aperture is continuously exposed to light beam 11 as the probe rotates and the photomultiplier tube output has a constant amplitude 49. The high frequency random amplitude variation indicated by dashed line 50 is caused by burrs on the side wall of the hole.

The relative speeds of the probe and transport bed are adjusted so that during the period in which the hole center is passing through coincidence with the longitudinal axis of the probe from a point displaced to one side by a distance equal to one-half of the measurement tolerance to a similar point along the direction of travel on the opposite side of the probe axis, the scanning aperture makes approximately ten or more revolutions over the hole. A transport bed speed of ¼ inch per second associated with a probe rotational speed of 240,000 r.p.m., for example, permits eight revolutions to occur within a .0005 inch measuring tolerance. As the leading edge of the hole passes beyond the inspection region, a sequence of pulses similar to those depicted in 43 through 48 appears at the output of photomultiplier tube 25 in inverse order to which they occurred when the hole was entering the inspection region.

The probe 19 is typically rotated at speeds in a range from 60,000 r.p.m. to 240,000 r.p.m. by the rotor of an air turbine in which it is concentrically mounted. Although an air turbine is the presently preferred means for driving the rod, synchronous motors may also be used. As a result of the interdependency between the rotary speed of the probe and the translatory speed of the transport bed, however, the substantially lower rotational speed of synchronous motors will decrease either the accuracy of the measurements or the rate at which they may be made. Referring to FIG. 1, a better understanding of the foregoing statement will be obtained by considering the method for measuring hole diameter. As previously explained, when a hole moves under the appropriate scanning aperture, a detectable electrical pulse exceeding the system noise level is produced at the output of photomultiplier tube 25 which connects to low noise amplifier 51. A short time before the hole 22 is scheduled to arrive at the inspection region, a signal 52 from the counter 53 opens gate 54 in the data processing system 55, thereby enabling the amplified photomultiplier tube output signal 56 to pass into level detector 57 which is set at a reference threshold corresponding to the system noise level. When the amplitude of signal 56 exceeds this reference threshold, a signal 58 from level detector 57 switches bistable multivibrator 59 causing electronic gate 60 to open so pulses pass from time base generator 61, which may be an astable multivibrator, through the differentiator and clipper circuit 62 into electronic counter 63. Counting continues while the hole remains in the inspection region. Shortly before the hole is expected to complete its traversal of the inspection region, the activating signal 52 applied to gate 54 is removed and a second signal 64 from the counter 53 opens gate 65 thereby enabling positive polarity pulses at the output of the Schmitt circuit 66 to pass through the gate 65 to reset bistable multivibrator 59 and terminate the diameter count as explained hereinafter. The Schmitt circuit receives its input signal through gate 67 from the reference generator 68 which is concentrically mounted on probe 19. The reference generator is a permanent magnet resolver type component which provides two time variable sinusoidal output signals 69 and 70 that are phase shifted relative to each other by ninety degrees. A signal 71 from the positioning system 32 activates gate 67 to transmit the appropriate reference generator output to the input terminals of the Schmitt circuit. Selection of the reference generator output is determined by whether the transport bed 29 is moving along a predetermined axis or orthogonal thereto.

Figure 4:
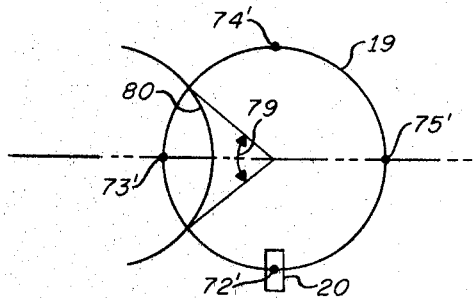
Figure 5:
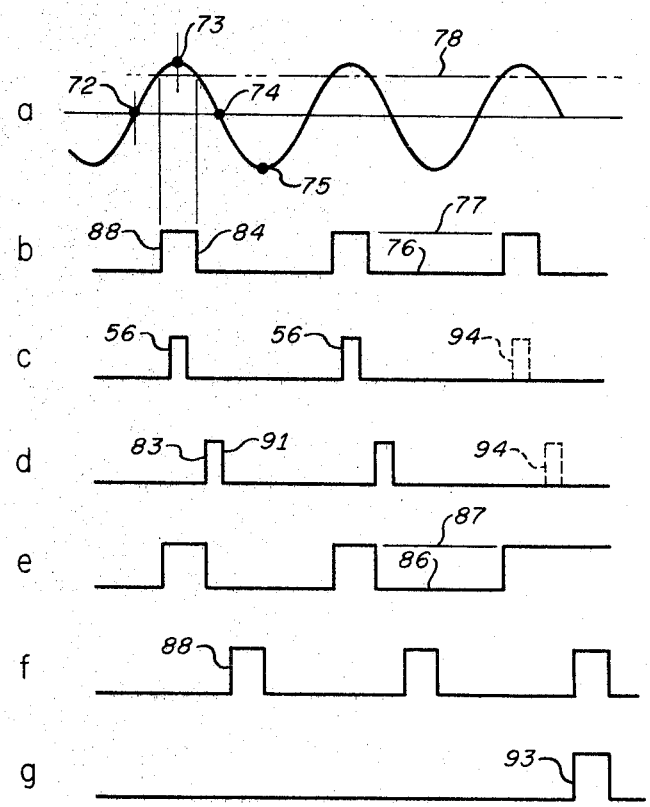

The manner in which the diameter count is stopped will now be described with reference to FIGS. 4 and 5 in conjunction with FIG. 1, wherein the numbered components relate to FIG. 1 unless otherwise designated. The reference generator provides a sinusoidal output signal having the amplitudes 72, 73, 74 and 75 in FIG. 5a corresponding to clockwise rotation of the scanning aperture 20 through position 72', 73', 74' and 75' in FIG. 4. The output pulses of the Schmitt circuit 66 alternately switch between the low voltage 76 and high voltage 77 of FIG. 5b as the reference generator output signal varies cyclically above and below the trigger level 78 in FIG. 5a. The high voltage pulses occur during the time interval that the scanning aperture is rotating through the angle 79 of FIG. 4. The amplified photomultiplier tube output pulses 56, FIG. 5c, occur when the hole nears completion of its traversal of the inspection region, that is, when the scanning aperture rotates over the trailing edge of a hole. When a hole is located at its correct position on the surface of the material part so that its axis of symmetry passes through the center of the inspection region, these pulses are symmetrically disposed about the center of the high voltage output pulses from the Schmitt circuit and continuously decrease in width as the scanning aperture intercepts successively smaller segments of the hole on each succeeding revolution of the probe 19. Although it is not essential, it is preferred that gate 65 remain closed until the hole advances to a position where the arcuate section 80 of its trailing edge is subtended by the angle 79 in FIG. 4. This assures that bistable multivibrator 81 will be switched only when the width of the amplified photomultiplier tube output pulses is less than the width of the output pulses from the Schmitt circuit, thereby providing a prescribed and reliable sequencing of the count terminating circuits. The amplified photomultiplier tube output pulses 56 are delayed in delay network 82 so that their leading edge 83, FIG. 5d, occurs after the trailing edge 84 of the high voltage Schmitt circuit output pulses, FIG. 5b. The Schmitt circuit output pulses are applied through gate 65 to input terminal 85 of bistable multivibrator 81 causing the multivibrator output signal, FIG. 5e, to switch from a low voltage 86 to a high voltage 87 in time phase with the leading edge 88, FIG. 5b, of the Schmitt circuit output pulses. Shortly thereafter the leading edge 83, FIG. 5d, of the pulse at the output of delay network 82, which is applied to input terminal 89 of bistable multivibrator 81 switches the multivibrator back to low voltage 86. The Schmitt circuit output pulses are also applied to delay network 90 wherein the leading edge 88 is delayed, as indicated in FIG. 5f, beyond the trailing edge 91, FIG. 5d, of the signal at the output of delay network 82. The output signal from bistable multivibrator 81 and delay network 90 are connected to the input terminals of AND circuit 92 which provides a positive output pulse 93, FIG. 5g, during the interval that time coincidence exists between the two input signals. A positive pulse does not appear at the output of the AND circuit until an amplified photomultiplier tube output pulse fails to occur as shown by the dashed lines 94 in FIGS. 5c and 5d, at which time no pulse is available to reset bistable mulitivibrator 81 after it has been set by the output pulse of the Schmitt circuit. This happens only after the hole has passed out of the inspection region. The pulse at the output of the AND circuit resets bistable multivibrator 59 to its original state thereby closing gate 60 and stopping the count. The Schmitt circuit is typically adjusted to provide high voltage output pulses having a duration equal to approximately one-sixth of the period of the sinusoidal signal obtained from the reference generator so that ample time is available for the generator and processing of the delayed signals.

Hole diameter is ascertained from the information in the electronic counter 63 by comparing it in the comparator unit 95 of the data processing system with a reference count representative of the nominal hole diameter. The reference diameter count is equal to the count that is obtained from a hole with the nominal diameter travelling under the probe assembly at a predetermined speed. If the transport bed speed varies, however, while the pulse repetition frequency of the time base generator 61 remains constant, an erroneous diameter count results even though the hole diameter may be correct. For example, if a hole of nominal diameter passes under the probe assembly at reduced speed, the diameter count will be greater than the reference count because the hole remains in the inspection region for a longer period of time. Consequently, means must be provided to make the pulse repetition frequency of the time base generator proportional to the speed of the transport bed. Referring to FIG. 1, this is accomplished with lamp 96 whose light is collected by lens 97 and focused on reticle 98 which is attached to the transport bed. As the transport bed moves, the reticle, consisting of alternately transparent 99 and opaque 100 parallel bars, chops the light falling on photodiode 101 positioned immediately in back of the reticle and produces a square wave electrical signal at the photodiode output. This electrical signal, after being amplified, differentiated and negative pulse clipped in amplifier 102, synchronizes the time base generator 61. Gate 103 remains closed when the transport bed is stationary or is stepping sideways between a row of holes. At the moment the transport bed starts to move, a pulse produced at the output of amplifier 102 switches bistable multivibrator 104, providing an output signal 105 that opens gate 103. As a result, counter 53 does not start to count until the transport bed moves. Since the time base generator output signal which feeds through circuit 62 and gate 103 into counter 53 is synchronized to the speed of the transport bed, the count contained in counter 53 indicates the distance travelled by the transport bed irrespective of variations in its speed. The counter 53 therefore indicates the position relative to the inspection region of the leading edge, center, and trailing edge of holes located at their specified positions. At the end of a row of holes, the counter 53 resets to zero and provides a signal 106 to both the command unit 31 and bistable multivibrator 104. This signal instructs the transport bed to step sideways to the next row of holes and reswitches bistable multivibrator 104 thereby closing gate 103 until inspection of the adjacent row of holes is commenced.

Measurement error is caused by an aperture widening effect which results from some of the rays in light beam 11 not being parallel to the probe axis 18. This effect makes a hole appear larger than it actually is because certain light rays in the collimated beam 11 reach the scanning aperture when the hole is outside the inspection region. These rays enter the scanning aperture obliquely and propagate through the probe by means of internal reflections from its side wall. The existence of these non-parallel rays may be ascribed to either inadequate collimation of light beam 11 or diffraction caused by burrs in the side wall of the holes undergoing inspection. The internal reflections from the side wall of the probe and the concomitant reduction of measurement accuracy may be substantially reduced, however, by finely etching the cylindrical surface of the probe or alternatively by cladding its exterior surface with a layer of material which is characterized by both high light absorption and an index of refraction slightly lower than that of the probe. These refinements in the construction of the probe cause the oblique rays to transmit through the side wall instead of being internally reflected. The metal sleeve 107 is placed on the solid rods such as quartz or glass to block ambient light from the probe and integrating sphere and thus lower the noise level.

Burr content is determined from the amplitude of the high frequency content of the amplified photomultiplier tube output signal 56 during the interval that the specified hole center is traversing the central portion of the inspection region from a point disposed on one side of the longitudinal axis of probe 19 by a distance equal to one-half of the measurement tolerance to a similarly disposed diametrically opposite point. When the specified hole center arrives at this central portion of the inspection region, signal 108 from the counter 53 opens gate 109 permitting the amplified photomultiplier tube output signal 56 to pass through high pass filter 110 into peak detector 111. The amplitude of the signal at the output of the peak detector is proportional to the size of protuberances on the side wall of a hole. Burr content in excess of the allowable tolerance is ascertained by comparing the output signal of peak detector 111 with a referance signal in the comparator unit 95. The high pass filter 110 has a low frequency cutoff corresponding to the fourth harmonic of the rotation rate of probe 19 for reasons that will become apparent in connection with the subsequent description relating to analog methods for determining hole roundness and location.

Hole location is determined by comparing one-half of the reference diameter count with the pulse count obtained by measuring from the leading edge of a hole to the specified hole center. A signal 112 applied to the counter 63 from the counter 53 commands a read-out of counter 63 at the instant counter 53 indicates coincidence between the center of probe 19 and the specified center of the hole. Comparison of the reference and measured counts is performed in the processor unit by conventional digital methods. Measurement of hole diameter and location along a second axis perpendicular to the first axis, along which these measurements were made, is performed by imparting a corresponding orthogonal translatory motion to the transport bed. In this mode of operation an auxiliary reticle system (not shown) having its transparent and opaque bands oriented transverse to the second direction of motion, is used to synchronize the astable multivibrator of time base generator 61. Hole symmetry is ascertained by comparing the orthogonal diameter measurements in the comparator unit 95. Since hole diameter, location and symmetry are based on the diameter count, these characteristics may be measured for both round and square or rectangular shaped holes.

Figure 6:
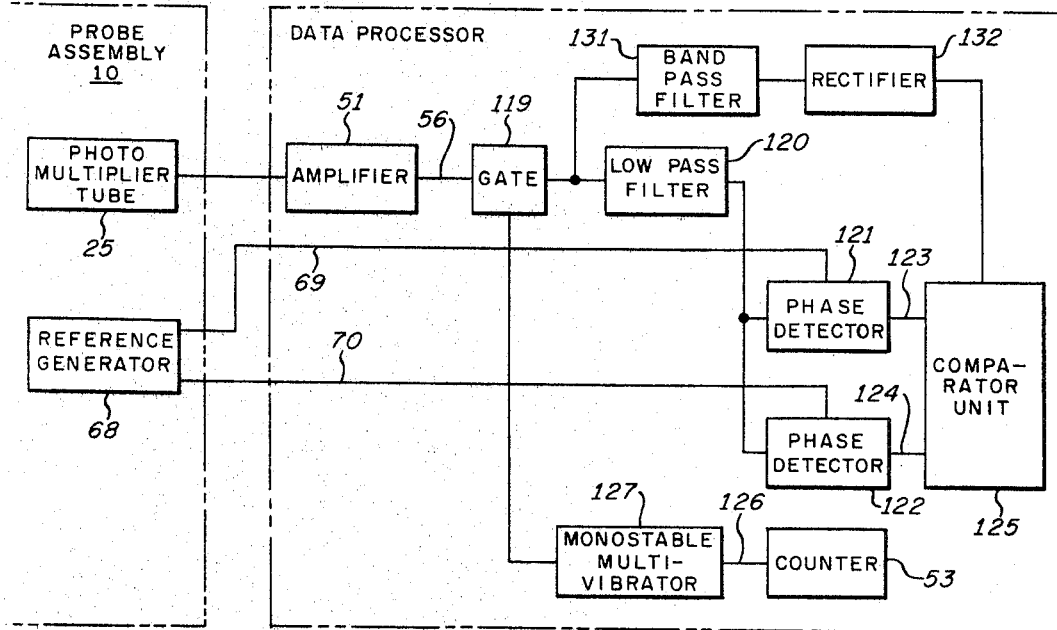
FIG. 6 is a partial pictorial drawing of another embodiment of the invention.
Figure 7A:
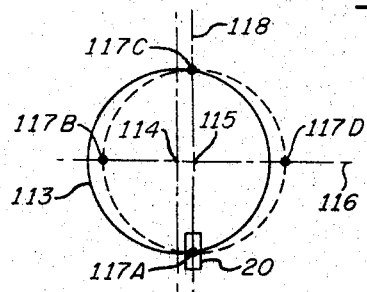
FIGS. 7–8 are diagrams useful in explaining the operation of the embodiment of the invention shown in FIG. 6.
Figure 7B:
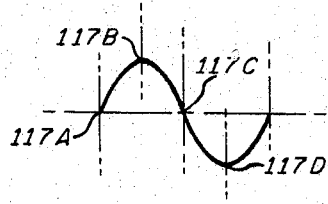

Analog methods for determining hole location and roundness will now be described with reference to FIGS. 6, 7 and 8, wherein the numbered components refer to FIG. 6, unless otherwise designated. FIG. 7a depicts a perfectly round hole 113 which has its center 114 displaced from the center 115 of the inspection region along axis 116. As the scanning aperture 20 rotates in a clockwise direction, beginning at 117A and proceeds through positions 117B, 117C and 117D, an electrical signal appears at the output of photomultiplier tube 25, having the waveform shown in FIG. 7b wherein 117A', 117B', 117C' and 117D' represent the amplitudes corresponding to the similarly designated scanning aperture positions of FIG. 7a. A fundamental frequency, that is, one cycle of the waveform of FIG. 7b, is produced for each rotation of the probe 19 resulting, for example, in a one thousand c.p.s. signal for a probe rotation rate of 60,000 r.p.m. It is apparent that if the hole center is displaced along axis 116 an equal distance on the opposite side of the rod center, the waveform of FIG. 7b will have the same amplitude but will be shifted in phase by 180 degrees. If the hole center is removed from its correct location as a result of displacement along both axis 116 and orthogonal axis 118, the waveform of FIG. 7b will be phase shifted by some amount between 0 degrees and 360 degrees depending on the relative magnitude of the displacements along the orthogonal axes. The magnitude of the displacement of the hole center from its specified location may be ascertained by feeding the amplified photomultiplier tube output signal 56 through a low pass filter into an error detector which measures the amplitude of the fundamental frequency. To determine both the magnitude and direction by which a hole is displaced from its correct position, the amplified photomultiplier tube output signal is fed through gate 119 to low pass filter 120 which passes only the fundamental frequency into the phase sensitive detectors 121 and 122. The phase detectors measure the sine and cosine components of the amplified photomultiplier tube output signal with respect to reference signals 69 and 70 obtained from the reference generator 68. The D.C. signals 123 and 124 appearing at the output terminals of the phase sensitive detectors are applied to the comparator unit 125 which determines the direction and magnitude of the hole displacement. A signal 126 from the counter 53 activates monostable multivibrator 127 so gate 119 is opened only during the time the specified hole center is in the central portion of the inspection region. This precludes the possibility of erroneously indicating an intolerable hole displacement if a fundamental frequency component appears in the output signal 56 at any time when the specified hole center is outside the central portion of the inspection region.

Figure 8A:
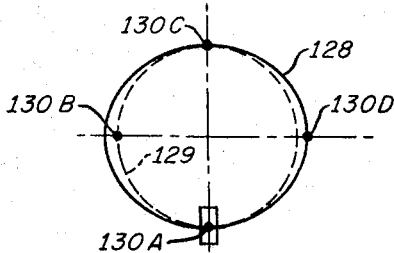
Figure 8B:
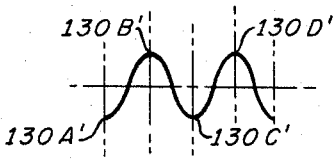

FIG. 8a depicts an oblong hole 128 which is centered under the end 129 of the rotating probe. As the scanning aperture 20 rotates in a clockwise direction beginning at position 130A and proceeds through positions 130B, 130C and 130D, the electrical signal produced at the output of photomultiplier tube 25 is as shown in FIG. 8b, wherein 130A', 130B', 130C' and 130D' represent the signal amplitudes corresponding to the similarly designated positions of the scanning aperture. Inspection of an oblong hole, therefore, produces a signal which is a second harmonic of the frequency corresponding to the rotation rate of probe 19, that is, two cycles occur for each revolution of the scanning aperture. The signal from gate 119 is therefore applied through a second harmonic bandpass filter 131 and a rectifier 132 into the processor unit 125 which indicates an out of round condition when the amplitude of the second harmonic exceeds a predetermined value representative of the required roundness tolerance.

Figure 9A:
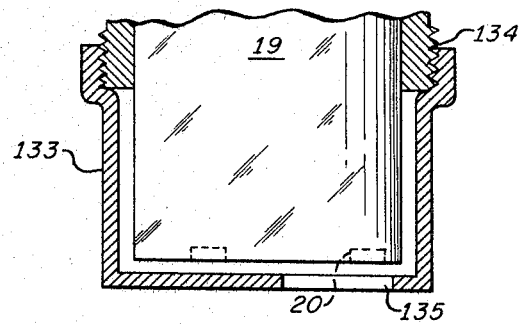
FIG. 9a is a partial sectional view of an alternative form of the optical probe used in the embodiments of the invention shown in FIGS. 1 and 6.
Figure 9B:
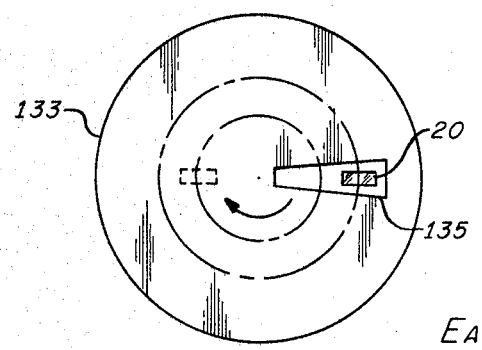

The collimated light beam 11 obtained from a standard arc source 12 may not have sufficient intensity for adequate collimation for those applications requiring extreme measurement accuracy. In such cases a laser may replace arc source 12, light collecting lens 13, aperture 14 and achromatic lens 15. Since the light output from a laser has a relatively narrow linewidth, that is, a wavelength of a single color, the color filter wheel 16 cannot be used as a means for selecting an appropriate scanning aperture. FIGS. 9a and 9b depict an alternate aperture selection apparatus which is particularly useful with laser light sources but not restricted thereto. The mask 133 fits over the end of probe 19 to which it is clamped, when the rod is stationary, by means of a chuck or collet mechanism 134 commonly employed in the machine tool field. The mask 133 has a radial slitted cut out section 135 which is positioned over the selected aperture 20 before the collet is tightened.

What is claimed is:

1. Apparatus for inspecting a hole in a material part comprising:
   (a) light beam generating means for producing a collimated light beam,
   (b) rotatable mask means disposed normal to an axis collinear with said collimated light beam,
   (c) transport means for translating the material part between said light beam generating means and said rotatable mask means such that the axis of symmetry corresponding to a hole located at its specified position on the surface of the material part is aligned parallel to and passes within predetermined limits of said collinear axis,
   (d) driver means for rotating said rotatable mask means about an axis that passes through the point of intersection of said collinear axis and said rotatable mask means, said rotatable mask means having an aperture transparent to said collimated light beam for transmitting light passing through a hole,
   (e) light responsive means positioned to receive the light transmitted through said aperture,
   (f) reference generator means for providing a phase reference signal to indicate the rotational position of said rotatable mask relative to a predetermined reference point,
   (g) position determining means for indicating the relative location of said collinear axis and the specified center of a hole,
   (h) utilization means responsive to signals from said light responsive means, said reference generator means and said position determining means for measuring characteristics of the hole.

2. The apparatus of claim 1 wherein the collimated light beam has a broad spectral bandwidth and the mask means has a plurality of apertures, each of said apertures having a discrete spectral passband and further comprising:
   optical filter means insertable between said light beam generating means and said mask means, said optical filter means having a plurality of filters with discrete spectral passbands corresponding to the spectral passbands of said plurality of apertures whereby any one of said plurality of filters may be inserted in the path of said collimated light beam.

3. The apparatus of claim 1 wherein the mask means having an aperture transparent to the collimated light beam comprises:
   two parallel planar elements rotatable relative to each other about said coplanar axis, one of said planar elements having a plurality of apertures and the other of said planar elements having an aperture positioned such that it may be adjusted into spatial coincidence with any one of the said plurality of apertures, the apertures in said planer elements being transparent to at least a common part of the spectrum of said collimated light beam.

4. The apparatus of claim 1 further comprising:
   compensation means for regulating said position determining means in accordance with the speed of said transport means.

5. The apparatus of claim 1 wherein the position determining means comprises:
   (a) signal counting means for obtaining a count indicative of the position of said transport means relative to a predetermined point, and
   (b) oscillator means for driving said signal counting means.

6. The apparatus of claim 1 wherein the utilization means comprises:
   (a) distance measuring means for measuring the size of a hole,
   (b) first means coupled to the signal from said light responsive means for activating said distance measuring means when the amplitude of the signal from said light responsive means exceeds a predetermined threshold,
   (c) second means coupled to the signal from said position determining means for enabling said second means to respond to the noncoincidence of pulses produced by signals from said light responsive means and said reference generator means for deactivating said distance measuring means.

7. The apparatus of claim 6 wherein the transport means translates the material part successively along orthogonal axes intersecting within predetermined limits from the specified hole center and the said second means is responsive to a signal from said transport means for selecting an appropriate signal from said reference generator means whereby a measurement of hole size is obtained along both of said orthogonal axes to measure hole symmetry.

8. The apparatus of claim 6 wherein the position determining means further provides a readout signal to the distance measuring means when the specified hole center is within predetermined limits of said collinear axis for determining whether a hole is at its correct position on the surface of the material part.

9. The apparatus of claim 6 wherein the distance measuring means comprises:
   (a) an oscillator providing a signal having a period proportional to the speed of said transport means,
   (b) an electronic counter coupled to receive the output of said oscillator for providing a count representative of the distance measured,
   (c) an electronic switch coupled to receive signals from said first means and said second means for initiating and terminating the counting process.

10. Apparatus for inspecting a hole in a material part comprising:
    (a) light beam generating means for producing a collimated light beam,
    (b) rotatable mask means disposed normal to an axis collinear with said collimated light beam,
    (c) transport means for translating the material part between said light beam generating means and said rotatable mask means such that the axis of symmetry corresponding to a hole located at its specified position on the surface of the material part is aligned parallel to and passes within predetermined limits of said collinear axis,
    (d) driver means for rotating said rotatable mask means about an axis that passes through the point of intersection of said collinear axis and said rotatable mask means, said rotatable mask means having an aperture transparent to said collimated light beam for transmitting light passing through a hole,
    (e) light responsive means positioned to receive the light transmitted through said aperture,
    (f) reference generator means for providing a phase reference signal to indicate the rotational position of said rotatable mask relative to a predetermined reference point,
    (g) position determining means for indicating the relative location of said collinear axis and the specified center of a hole,
    (h) first means coupled to receive the signal from said light responsive means for determining the amplitude of at least one of the constituent frequencies of said signal, and (i) second means responsive to a signal from said position determining means for coupling the signal from said light responsive means into said first means when the specified center of a hole is within predetermined limits from said collinear axis.

11. The apparatus of claim 10 wherein the first means is responsive to the amplitude of the fundamental frequency component of the signal from said light responsive means for determining the location of a hole on the surface of the material part.

12. The apparatus of claim 10 wherein the first means is responsive to the amplitude of the second harmonic frequency component of the signal from said light responsive means for determining the roundness of a hole.

13. The apparatus of claim 10 wherein the first means is responsive to the amplitude of frequency components greater than the fourth harmonic of the signal from said light responsive means for determining the burr content of a hole.

References Cited

UNITED STATES PATENTS

| | | | |
|---|---|---|---|
| 2,078,768 | 4/1937 | Meir | 250—226 X |
| 2,447,985 | 8/1948 | Mass | 250—226 |
| 2,532,964 | 12/1950 | Taylor et al. | 250—222 X |
| 2,964,639 | 12/1960 | Hobrough | 250—202 X |
| 2,989,642 | 6/1961 | Svec | 250—237 X |
| 3,099,748 | 7/1963 | Weiss | 250—203 |
| 3,146,350 | 8/1964 | Topfer. | |
| 3,150,264 | 9/1964 | Ehlert. | |
| 3,239,673 | 3/1966 | Unruh | 250—203 |
| 3,308,298 | 3/1967 | Rawls et al. | 250—203 |
| 3,371,215 | 2/1968 | Albarda | 250—237 |

RALPH G. NILSON, *Primary Examiner.*

C. M. LEEDOM, *Assistant Examiner.*

U.S. Cl. X.R.

88—14; 250—226, 228, 237